March 29, 1932.  P. E. WOOTEN  1,851,883
COTTON PICKER
Filed July 31, 1930   10 Sheets-Sheet 4

Fig. 4.

INVENTOR.
Pressley E. Wooten
BY
Geo. P. Kimmel
ATTORNEY.

March 29, 1932.  P. E. WOOTEN  1,851,883
COTTON PICKER
Filed July 31, 1930   10 Sheets-Sheet 5

Fig. 5.

INVENTOR.
Pressley E. Wooten
BY
Geo. P. Kimmel
ATTORNEY.

Fig.6.

March 29, 1932.   P. E. WOOTEN   1,851,883
COTTON PICKER
Filed July 31, 1930   10 Sheets-Sheet 7

INVENTOR.
Pressley E. Wooten
BY
Geo. P. Kimmel
ATTORNEY.

March 29, 1932.  P. E. WOOTEN  1,851,883
COTTON PICKER
Filed July 31, 1930   10 Sheets-Sheet 8

INVENTOR.
Pressley E. Wooten
BY
Geo. P. Kimmel
ATTORNEY.

March 29, 1932.  P. E. WOOTEN  1,851,883
COTTON PICKER
Filed July 31, 1930   10 Sheets-Sheet 9

INVENTOR.
Pressley E. Wooten
BY
Geo. P. Kimmel
ATTORNEY.

Patented Mar. 29, 1932

1,851,883

UNITED STATES PATENT OFFICE

PRESSLEY E. WOOTEN, OF RULEVILLE, MISSISSIPPI

COTTON PICKER

Application filed July 31, 1930. Serial No. 472,114.

This invention relates to a cotton picker and has for its primary object to provide, in a manner as hereinafter set forth, a machine by means of which cotton may be picked mechanically and delivered to a platform in a comparatively clean condition.

A further object of the invention is to provide a cotton picker of the character aforesaid which is provided with a plurality of needle carrying, rotatable picker elements for positive engagement with the cotton to remove the same from the boll.

A further object of the invention is to provide a cotton picker of the character aforesaid, wherein novel means are employed for stripping the cotton from the picker elements and delivering the same to the platform.

With the foregoing and other objects in view, the invention consists of the novel construction, combination and arrangement of parts as hereinafter more particularly described, and as illustrated in the accompanying drawings wherein is shown an embodiment of the invention, but it is to be understood that the description and drawings are to be taken as illustrative and that the invention is intended to be limited only by the scope of the claims hereunto appended.

In the accompanying drawings in which like numerals are employed to designate like parts throughout the several views.

Referring to the drawings in detail, the numeral 1 indicates a stationary frame provided with ground wheels 2 which may be of any suitable type. Extending transversely of the frame, adjacent the rearward end thereof, is a main drive shaft 3 which is provided at one end thereof with a suitable drive pulley 4. Slidably mounted on the drive shaft 3, adjacent each side of the frame, are a pair of drive gears 5 which are rotatable with the shaft 3 and which are connected together in spaced relation by means of a yoke 6. A spring 7 is mounted on the shaft 3 inwardly of each yoke 6, and a spring 8 is mounted on the shaft 3 outwardly from each yoke. Having their outer ends connected with the yokes 6 are a pair of links 9 which are pivotally connected at their inner ends to an operating lever 10 by means of which the gears 5 may be shifted longitudinally of the shaft 3. The links 9 are connected with the lever 10 on opposite sides of the pivotal mounting for the lever in order that the yokes 6 may be moved outwardly or inwardly simultaneously upon movement of the lever 10.

Extending along each side of the machine is a drive shaft 11 for a vertically movable frame 12. Each of the drive shafts 11 is provided at its rearward end with a gear 13 for engagement with a pair of the gears 5 on the drive shaft 3. Upon the engagement of one of the gears 5 of a pair with the gear 13 on a drive shaft 11, the latter will be driven in one direction, and upon engagement of the other gear 5 of said pair with the gear 13 on the drive shaft 11, the latter will be driven in the opposite direction. Fixedly mounted on each of the drive shafts 11 are a pair of gears 14 which mesh with the teeth of a pair of rack bars 15 carried by the movable frame 12. The frame 12 is provided at each side thereof with a pair of the rack bars 15, said rack bars and the gears 14 providing the mounting for the frame 12. Upon the rotation of the shafts 11 in one direction the frame 12 will be moved upwardly, and upon the rotation of the shafts 11 in the opposite direction the frame 12 will be moved downwardly.

Figure 12:
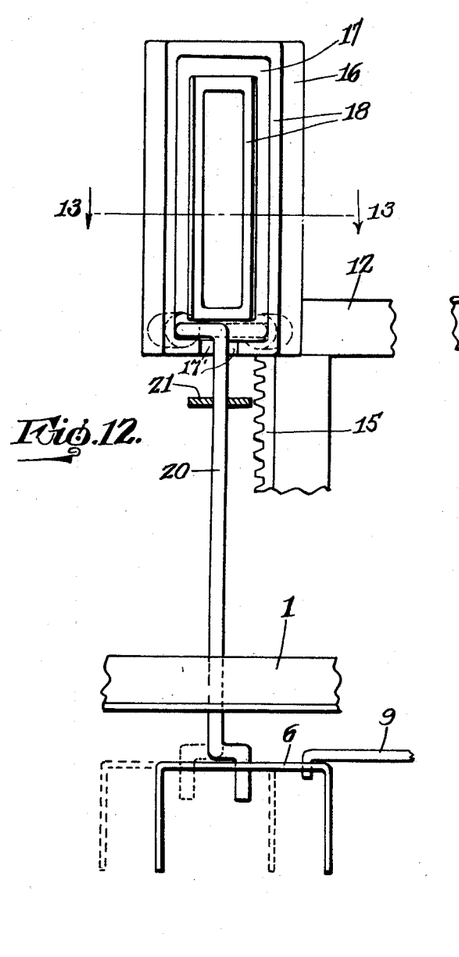
Figure 12 is a fragmentary rear elevation showing one of the guide elements carried by the movable frame for maintaining the gears of the main drive shaft in proper position with respect to the gears on the drive shafts for the movable frame.
Figure 13:
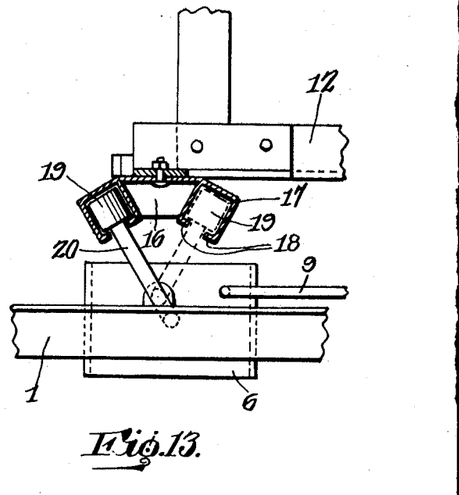
Figure 13 is a section taken on the line 13—13 of Figure 12.
Figure 14:
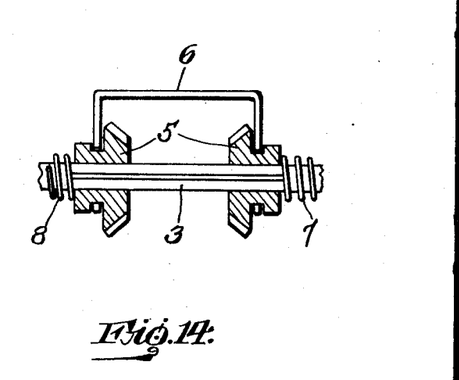
Figure 14 is a sectional detail showing one of the pairs of gears on the main drive shaft.

Carried by the movable frame 12 at the rear of the latter are a pair of guide elements 16, each of which is formed in its rearward face with an endless groove 17, the walls of which are formed at their rearward edges with oppositely extending flanges 18. Operating in each of the grooves 17 is a roller 19 which is rotatably mounted on the upper end of a crank 20, the lower end of which is rotatably connected with one of the yokes 6. Intermediate the ends of the crank 20, the latter extends through a supporting bracket 21 mounted on the frame 1. During the movement of the frame 12 in an upward direction, the rollers 19 are disposed within the outer vertical portions of the grooves 17, and during the movement of the frame 12 in a downward direction, the rollers 19 are disposed within the inner portions of the grooves 17. With the rollers 19 disposed in the outer vertical portions of the grooves 17, the outermost gears 5 of the pairs of gears on the drive shaft 3 are maintained in mesh with the gears 13, and with the rollers 19 disposed within the inner vertical portions of the grooves 17, the innermost gears 5 of the pairs of gears on the drive shaft 3 are maintained in mesh with the gears 13. The bottom wall of the grooves 17 are formed with slots 17' for receiving the rollers 19 when the frame 12 reaches the top of its path of movement to maintain the gears 5 neutral with respect to the gears 13 until the yokes 6 are shifted by means of the lever 10.

Forming a part of the movable frame 12 is a stationary plate 22 which in the present instance is of double construction and which is perforated for the reception therethrough of a plurality of vertically disposed picker elements indicated generally at 23. The picker elements 23 slidably extend through the plate 22 and slidably mounted on each of the picker elements 23 is a worm 24 for rotating the picker elements. The picker elements 23 are arranged in alignment from front to rear of the machine in order that the worms 24 on the picker elements may be in mesh with worms 25 on a plurality of worm shafts 26 mounted on the plate 22 and extending from front to rear of the machine. The worm shafts 26 are provided at their rearward ends with beveled gears 27 which are in mesh with similar beveled gears 28 fixedly mounted on a shaft 29 extending transversely of the plate 22 adjacent the rearward edge of the latter. It will be seen that the picker elements 23 will be rotated upon the rotation of the shaft 29.

Figure 9:
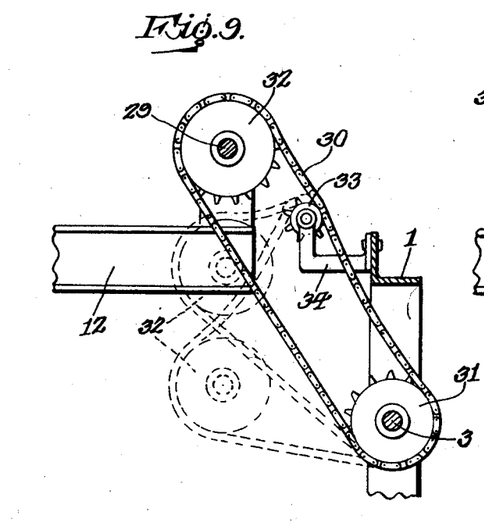
Figure 9 is a detailed view in sectional elevation showing the driving means for the picker elements.

The shaft 29 is driven from the shaft 3 by means of a sprocket chain 30 which extends around a pair of sprockets 31 and 32 respectively mounted on the shafts 3 and 29. In order that the chain 30 may be maintained comparatively free of slack during vertical movement of the frame 12, an idler sprocket 33 is maintained in mesh with the chain 30, said idler sprocket being mounted on a bracket 34 secured to the stationary frame 1. The operation of the idler sprocket 33 to maintain the chain 30 comparatively free of slack is illustrated in Figure 9, wherein the sprocket 32 is shown in full lines in its extreme upper position, and in dotted lines in successive lower positions.

Figure 10:
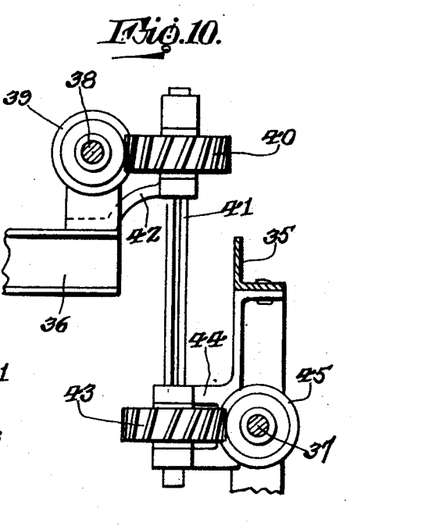
Figure 10 is a modification of the means shown in Figure 9.

A modified form of driving means for the shaft 29 is illustrated in Figure 10, wherein the frames 35 and 36 correspond to the frames 1 and 12 respectively, and the shafts 37 and 38 correspond to the shafts 3 and 29 respectively. In this form of driving means, the shaft 38 is provided with a worm 39 which is in mesh with a worm 40 fixedly mounted on a floating, vertically disposed shaft 41. The hub of the worm 40 seats on a bracket 42 carried by the movable frame 36. The shaft 41 slidably and non-rotatably extend through a worm 43 carried by a bifurcated bracket 44 mounted on the frame 35, the worm 43 being in mesh with a worm 45 fixedly mounted on the shaft 37. Upon movement of the movable frame 36, the floating shaft 41 slides through the worm 43.

Figure 15:
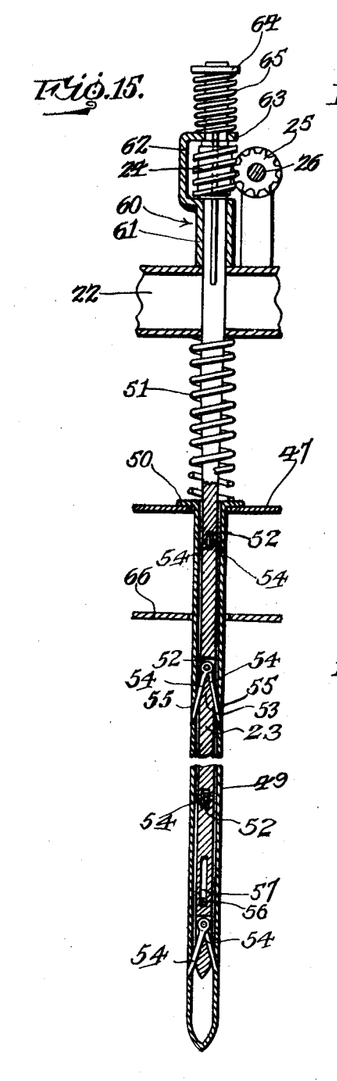
Figure 15 is a fragmentary section of one of the picker elements and parts associated therewith, showing the needles of the picker elements in retracted position.
Figures 16, 17, 18:
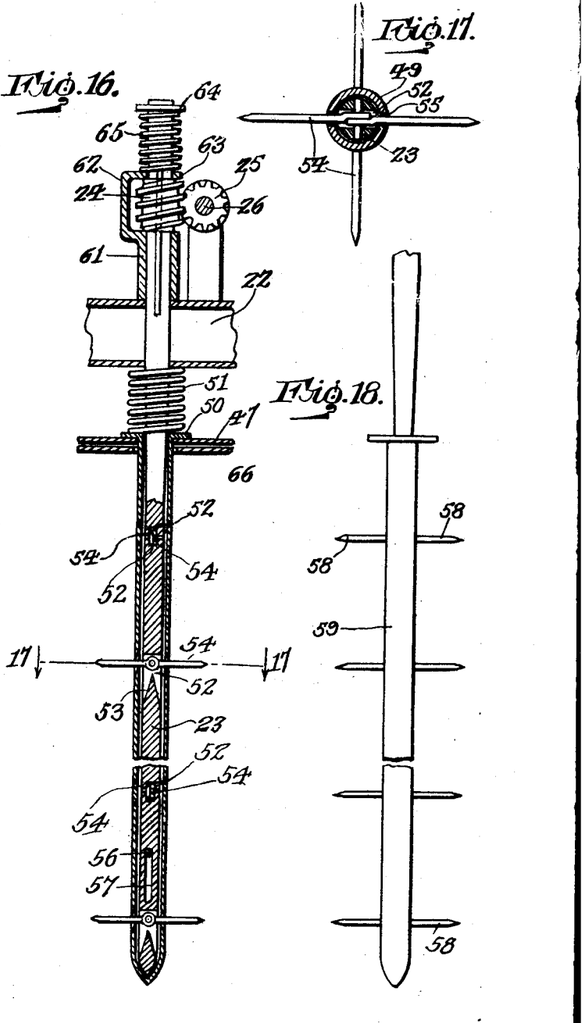
Figure 16 is a view similar to Figure 15 showing the needles in extended position.
Figure 17 is a section taken on the line 17—17 of Figure 16.
Figure 18 is a fragmentary elevation of a modified form of picker element.

Suspended from the frame 12 by means of flexible straps 46, is a floating plate 47 which is provided with a plurality of perforations 48 for the extensions therethrough of housings 49 for the lower end portions of the picker elements 23. The housings 49 are formed at their upper ends with outturned flanges 50 which seat on the upper face of the floating plate 47. The flanges 50 are maintained in position on the plate 47 by means of coiled springs 51 which encircle the picker elements 23 between the floating plate 47 and frame 12. The springs 51 normally maintain the plate 47 in spaced relation to the frame 12, in which position the straps 46 supporting the plate 47 are maintained taut. The lower end portion of each picker element 23 is provided with spaced slots 52 extending transversely therethrough, the bottom walls of the slots at the ends of the latter being downwardly and outwardly inclined as indicated at 53. Having their inner ends pivotally mounted within each slot 52, are a pair of needles 54 which project from the slots in opposite directions. Alternate slots 52 are disposed at right angles to each other in order that alternate pairs of fingers 54 may be projected at right angles from the picker elements. With the needles 54 in retracted position as shown in Figure 15, end portions of the needles are disposed within downwardly and outwardly inclined slots 55 formed in the housings 49 for the picker elements. Upon relative movement of the picker element 23 with respect to the housing, the needles 54 will be projected through the slots 55 into the positions shown in Figure 16. Relative movement between the picker element 23 and housing 49 is limited by means of a pin 56 which slidably extends through an elongated slot 57 in the element 23, the ends of the pin being secured to the housing 49. In the modified form of picker element illustrated in Figure 18, the pairs of needles 58 are disposed in vertical alignment when projected from the housing 59 for the lower end portion of the picker element.

The worms 24 are maintained in mesh with the worms 25 by means of a retaining member 60 associated with each picker element. Each retaining member 60 includes a cylindrical portion 61 fixedly mounted on the frame 12 and having a picker element 23 slidably and rotatably extending therethrough. Formed on the upper end of each cylindrical portion 61 is an angular bracket 62 having an apertured head 63 through which the upper end of a picker element 23 extends. Rotatably mounted on the upper end of each picker element 23 is a washer 64 to which is connected the upper end of a coiled spring 65 which encircles the picker element 23, and the lower end of which is connected with the head 63 of a retaining member 60. The tension of the spring 65 normally prevents relative movement between the picker element 23 and movable frame 12. In the event of the picker element meeting some obstruction during the downward movement, the picker element may move relative to the frame 12 against the tension of the spring 65.

Figure 6:
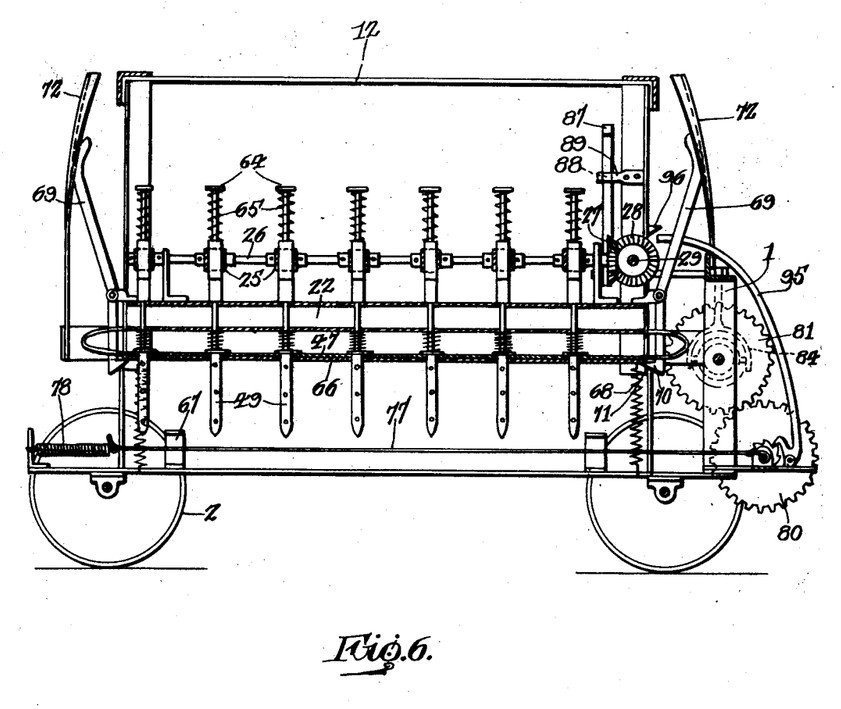
Figure 6 is a sectional side elevation showing the position of the parts just prior to the stripping operation.
Figure 11:
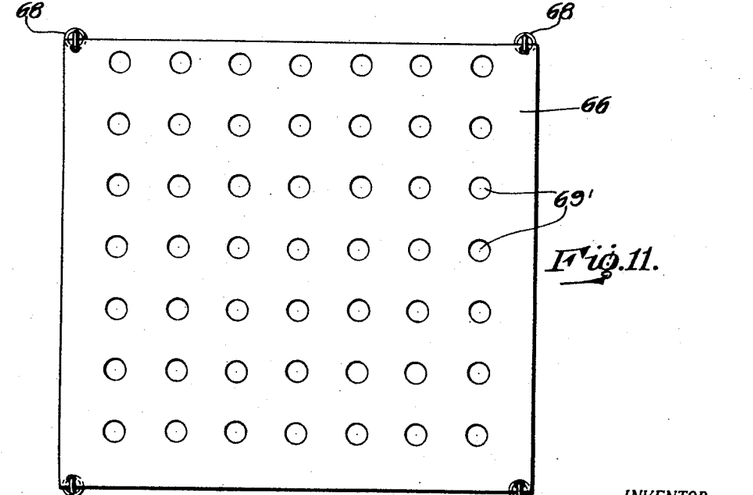
Figure 11 is a top plan of the stripper plate.

Disposed beneath the floating plate 47 is a stripper plate 66 which is normally maintained seated on a plurality of legs 67 on the frame 1 by means of a plurality of springs 68, the respective ends of which are connected with the stripper plate 66 and frame 1. The stripper plate 66 is provided with a plurality of openings 69' for the passage therethrough of the housings 49 for the lower end portions of the picker elements 23. During certain periods in the operation of the picker, the stripper plate 66 is moved upwardly against the tension of the springs 68 as shown in Figure 6. This movement is accomplished by means of a plurality of levers 69, a pair of which are pivotally mounted to the frame 12 at each side of the latter. Each lever 69 is pivotally connected to the frame 12 intermediate the ends of the lever the latter being formed at its lower end with an inwardly directed nose 70 having a beveled lower face 71. An upper end portion of each lever 69 is curved inwardly and seats within a grooved guide member 72 projecting upwardly from the stationary frame 1. The levers 69 are maintained in engagement with the guides 72 by means of springs 73 provided on the levers adjacent their pivotal connections with the frame 12. The guides 72 are inclined upwardly and inwardly in order that the noses 70 may be drawn under the stripper plate 66 at the lower end of the path of movement of the frame 12, and may be withdrawn from their positions beneath the stripper plate 66 during the upward movement of the frame 12.

Projecting rearwardly from the frame 1 is a delivery platform 74 which extends transversely of the machine. The platform 74 is provided with a pair of upstanding brackets 75 between which is mounted a roller 76 upon which is wound the rearward end portion of a web 77. Connected with the forward head of the web 77 are a pair of springs 78, the forward ends of which are secured to brackets 79 on the frame 1, and which exert a force on the web 77 to normally maintain the latter beneath the stripper plate 66 as shown in Figure 6. Fixedly mounted on the roller 76 is a gear 80 which is constantly in mesh with a gear 81 loosely mounted on the drive shaft 3. The gear 81 is formed with a hub clutch 82 for engagement by a clutch element 83 slidably and non-rotatably mounted on the drive shaft 3. Connected with the clutch element 83 is the lower end of a lever 84, the upper end of which is secured to a rock shaft 85 rotatably mounted on a bracket 86 carried by the frame 1. Secured to the opposite end of the rock shaft 85 is a lever 87 which curves upwardly and inwardly and terminates at its upper end in alignment with a lug 88 carried by a bracket 89 projecting from the movable frame 12. Just prior to the completion of the upward movement of the frame 12, the lug 88 is brought into engagement with the lever 87 whereby the web 77 is wound on the roller 76 by the action of the gears 81 and 80. The clutch element 83 is normally maintained out of engagement with the hub clutch 82 by means of a spring 90 bearing against the lever 84.

The web 77 is normally prevented from being unwound from the roller 76 by the action of the springs 78 by means of a pawl 91 which is normally maintained in engagement with the teeth of a ratchet 92 fixedly mounted on the roller 76. The pawl 91 is pivotally mounted on a bracket 93 projecting from the platform 74 and is normally maintained in engagement with the ratchet 92 by means of a leaf spring 94 bearing against the rearward face of the pawl. Formed integrally with the pawl 91 is an actuating arm 95 which curves upwardly and inwardly and terminates with its upper end in vertical alignment with a lug 96 carried by the frame 12. The lug 96 is pivotally mounted on the frame 12 in a manner to permit the lug to freely move in an upward direction about its pivot in order that the arm 95 will not be actuated by the contact therewith of the lug 96 during the downward movement of the frame 12. Upon contact of the lug 96 with the arm 95 during the upward movement of the frame 12, the arm 95 will be actuated to withdraw the pawl 91 from engagement with ratchet 92 whereby the springs 78 may operate to unwind the web 77 from the roller 76 and draw the web beneath the stripper plate 66. This movement of the arm 95 takes place just prior to the stripping operation which will presently be described.

In the use of the cotton picker, the same is moved into position by means of any suitable motive power, such as a tractor, not shown, from which the drive pulley 4 may be operated. During the bodily movement of the picker, all the operating parts thereof except the drive shaft 3 and gears 5 are stationary, and during the operation of the picker, the same is at rest, when considered as a unit. The picker is moved bodily from one position to another while the operating parts thereof are in the position shown in Figure 3, in which position the web 77 is wound upon the roller 66, and the rollers 19 are engaged by the walls of the slots 17'. Movement of the frame 12 is initiated by manually shifting the lever 10 to engage the innermost gears 5 with the gears 13 to provide for downward movement of the frame 12 with the rollers 19 disposed in the inner vertical portions of the grooves 17, whereby the above mentioned gears 5 and 13 are maintained in mesh. When the frame 12 has been lowered to such an extent that the rollers 19 are brought into alignment with the upper horizontal portions of the grooves 17, the action of the springs 8 forces the outermost gears 5 into mesh with the gears 13 whereby the frame 12 is moved upwardly with the rollers 19 disposed in the outer vertical portions of the grooves 17. When the frame has moved upwardly to its original position, the action of the springs 7 forces the gears 5 into neutral positions with respect to the gears 13, in which position the rollers 19 are engaged within the slots 17' to prevent further movement of the frame 12 until the yokes 6 are manually shifted by means of the lever 10. From the foregoing it will be seen that the movement of the frame 12 is entirely automatic throughout one complete cycle.

Figure 1:
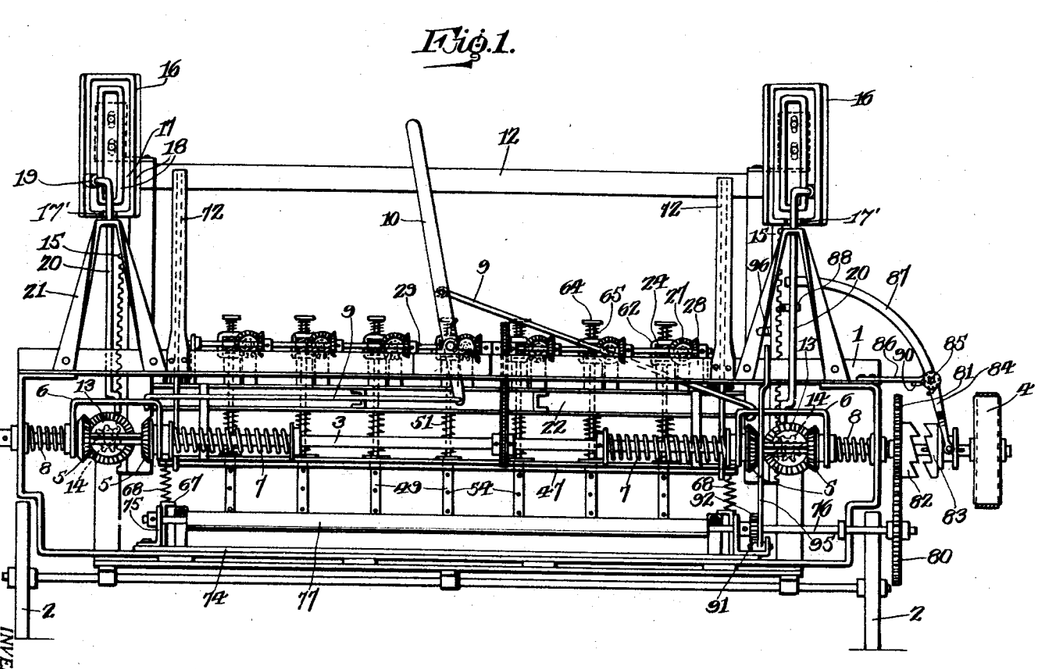
Figure 1 is a rear elevation of the cotton picker in accordance with this invention.
Figure 2:
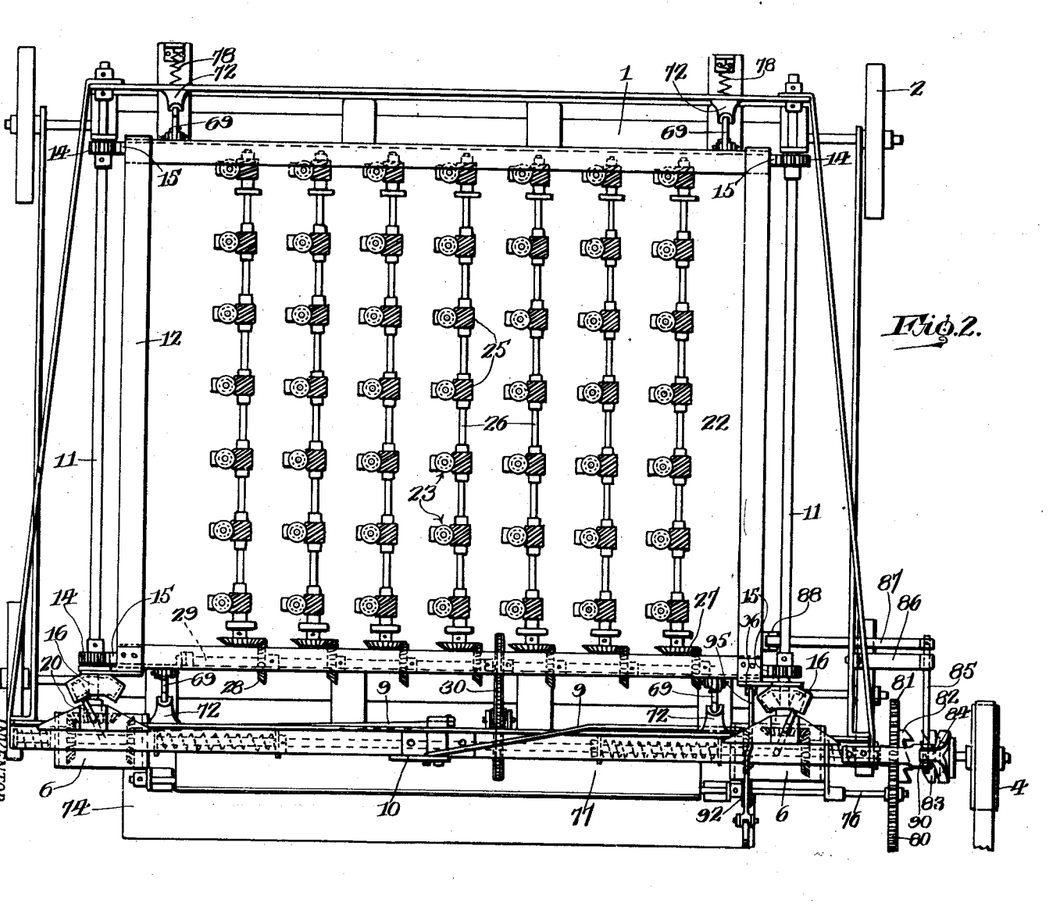
Figure 2 is a top plan thereof.
Figure 3:
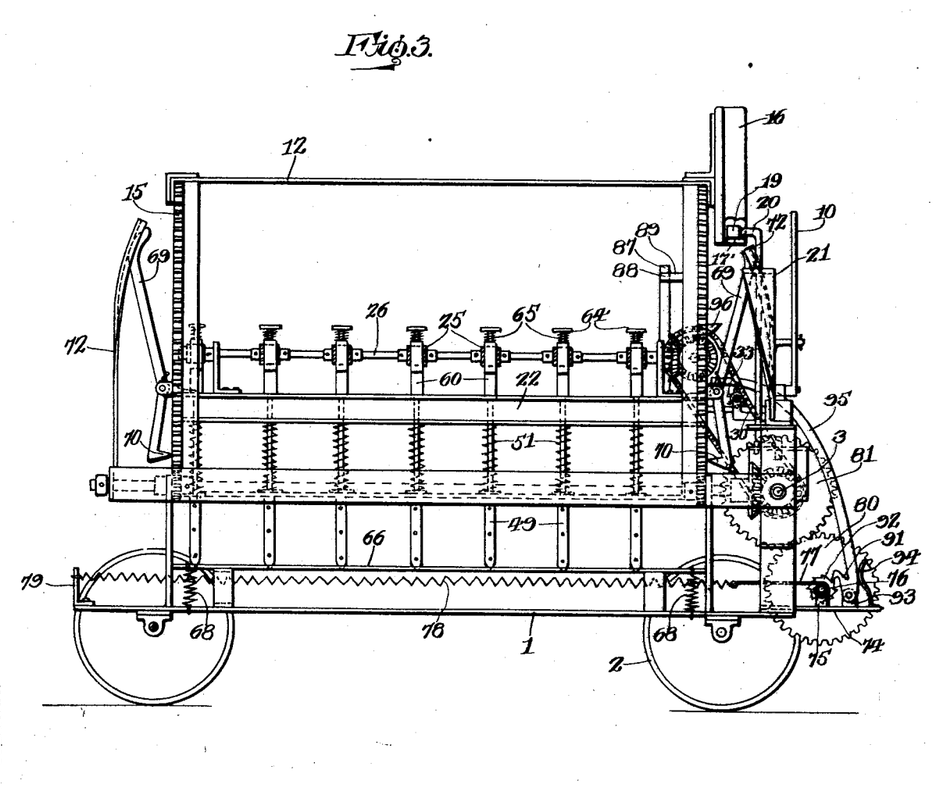
Figure 3 is a side elevation thereof showing the position of the parts when the cotton is being delivered to the platform.
Figure 4:
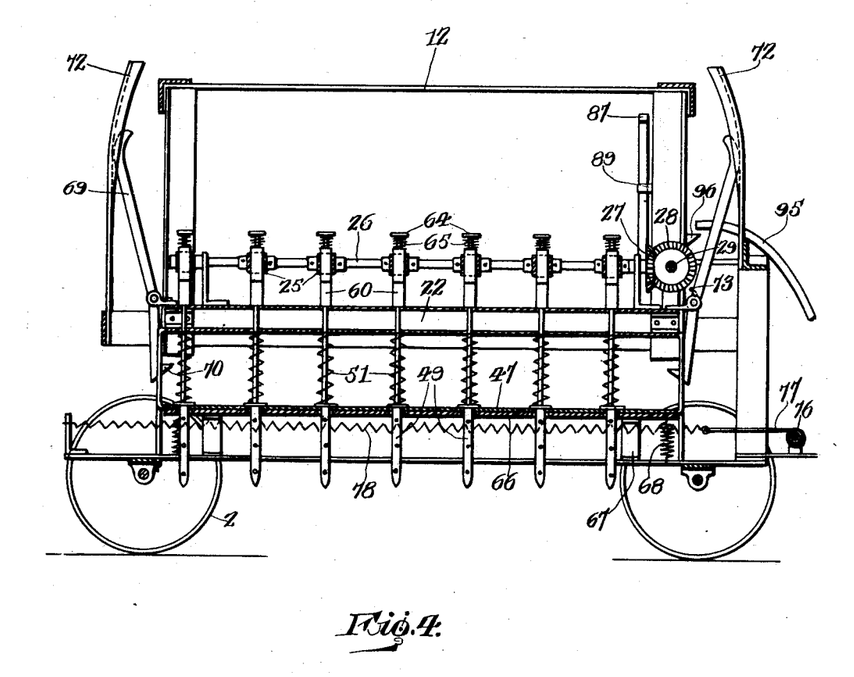
Figures 4 and 5 are sectional side elevations showing the position of the parts during successive stages of the picking operation.
Figure 5:
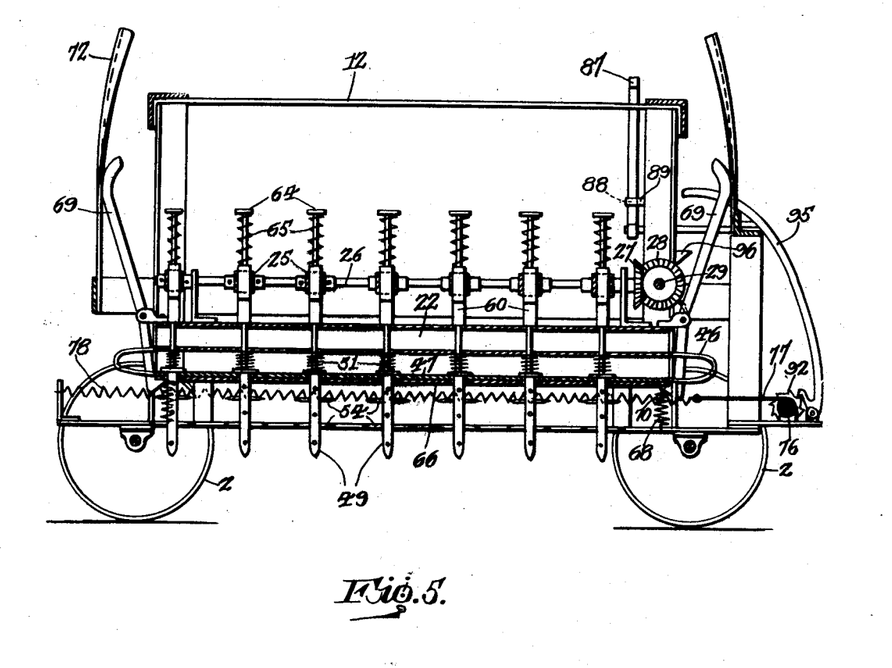

Assume the operative parts of the picker to be in the positions shown in Figure 3 with the web 77 wound on the roller 76. The lever 10 is shifted manually as aforesaid to initiate downward movement of the frame 12. During such movement of the frame 12, the web 77 is maintained in its rolled position upon the roller 76 by means of the pawl 91 and ratchet 92. The floating plate 47 moves downwardly with the frame 12 until the latter reaches the position shown in Figure 4, in which position the plate 47 is seated on the stripper plate 66, and the latter is seated on the legs 67. Upon a further movement of the frame 12 in a downward direction, the springs 51 will be compressed as shown in Figure 5 wherein the frame is shown at the limit of its downward movement. During the movement of the frame 12 from the position shown in Figure 4 to that shown in Figure 5, the picker elements 23 move downwardly with respect to the housings 49 whereby the needles 54 are moved into their extended positions for picking cotton from the bolls owing to the rotation of the picker elements. When the frame 12 reaches the position shown in Figure 5, the noses 70 of the levers 69 are moved under the stripper plate 66 whereby the latter is moved upwardly by the frame upon the upward movement of the latter to the position shown in Figure 6. During the movement of the frame 12 from the position shown in Figure 5 to that shown in Figure 6, the housings 49 of the picker elements have been moved above the horizontal plane of the web 77, and the lug 96 has been moved upwardly past the upper end of the arm 95. At the same time that the lower ends of the housings 49 clear the horizontal plane of the web 77, the lug 96 is brought into engagement with the arm 95 whereby the pawl 91 is released from the ratchet 92 which permits the springs 78 to operate to draw the web 77 beneath the stripper plate 66 as shown in Figure 6. Upon a further upward movement of the frame 12 to the position shown in Figure 7, the noses 70 of the levers 69 are withdrawn from beneath the stripper plate 66 owing to the contact of the upper ends of the levers with the guide 72, and upon the removal of the noses 70 from beneath the plate 66, the springs 68 operate to draw the stripper plate 66 into seating position with respect to the legs 67. Coincidentally with the downward movement of the stripper plate 66, the floating plate 47 is moved downwardly by the compression of the springs 51 whereby the needles 54 are retracted as the cotton is stripped therefrom by the stripper plate 66, owing to the relative movement between the housings 49 and picker elements 23.

Figure 7:
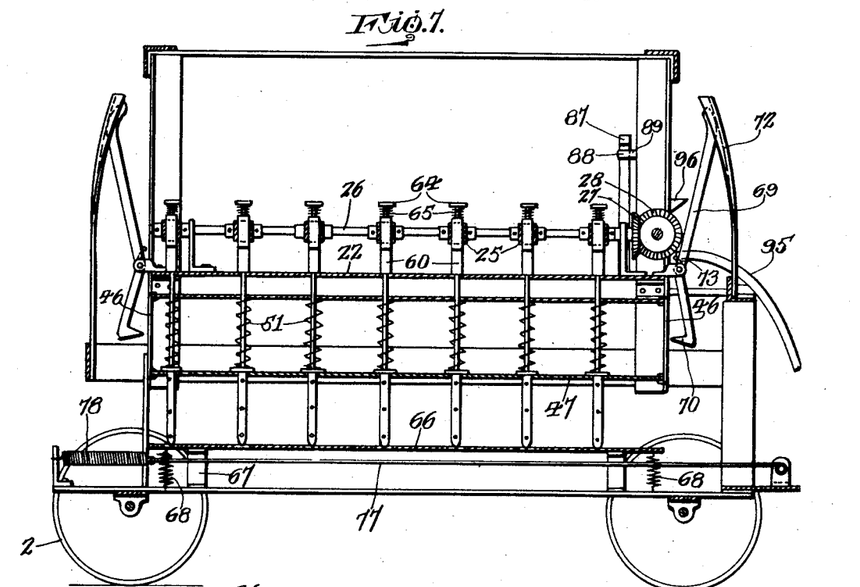
Figure 7 is a sectional side elevation showing the position of the parts at the completion of the picking operation.
Figure 8:
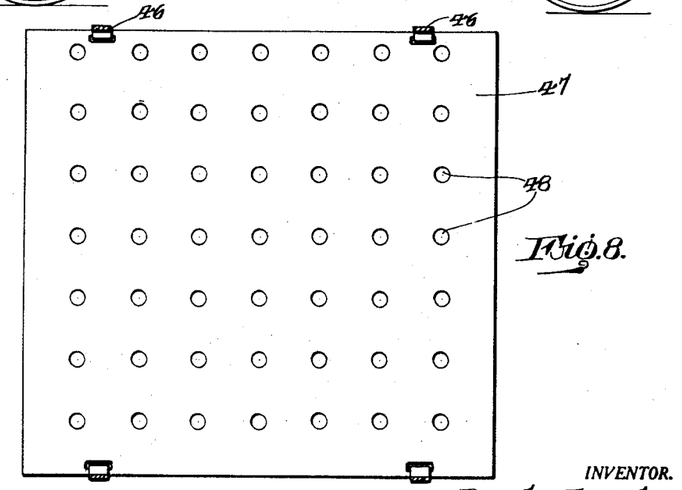
Figure 8 is a top plan of the floating plate suspended from the movable frame.

It is to be noticed that when the frame 12 reaches the position shown in Figure 7, the lug 88 is barely out of contact with the lever 87. During a further upward movement of the frame 12 to the position shown in Figure 3, the lug 88 is brought into engagement with the lever 87 whereby the clutch element 83 is engaged with the hub clutch 82 to provide for the rotation of the roller 76 to wind the web 77 thereon and to deliver the cotton on the web to the platform 74.

It is thought that the many advantages of a cotton picker in accordance with this invention will be readily found, and although the preferred embodiment of the invention is as illustrated and described, it is to be understood that changes in the size, shape and arrangement of parts may be resorted to, so long as such changes fall within the scope of the invention as defined in the appended claims.

What I claim is:—

1. A cotton picker comprising, a plurality of vertically disposed rotatable picker elements, a foraminous stripper plate through which the picker elements extend, means for moving said plate and picker elements in unison for a predetermined distance in an upward direction, means following the operation of the first named means for moving said plate downwardly to strip cotton from the picker elements, a web for receiving the cotton stripped from the picker elements, and means synchronized with the stripper plate for withdrawing the web to discharge the cotton thereon following the stripping operation of the stripper plate.

2. A cotton picker comprising, a vertically movable frame, means for vertically reciprocating the frame, a plurality of vertically disposed rotatable picker elements carried by the frame, a foraminous stripper plate through which the picker elements extend, means carried by the frame for securing the stripper plate thereto during a predetermined portion of the upward movement of the frame, means to provide for said plate moving downwardly upon a continued upward movement of the frame to strip the cotton from the picker elements, a web for receiving the cotton stripped from the picker elements, and means operated by the frame for withdrawing the web to discharge the cotton thereon upon the completion of the stripping operation of the stripper plate.

3. A cotton picker comprising, a stationary frame, a vertically movable frame, mounted above said stationary frame, means for vertically reciprocating the movable frame, a perforated stripper plate disposed beneath the movable frame, resilient means exerting a downward force on the stripper plate to normally seat the same on the stationary frame, a plurality of vertically disposed rotatable picker elements carried by the movable frame for extension through the perforated stripper plate during downward movement of the movable frame, means for connecting the stripper plate with the movable frame to provide for the lifting of the stripper plate during the first portion of the upward movement of the movable frame, releasing means for said connecting means to provide for downward movement of the stripper plate to strip the cotton from the picker elements upon a continued upward movement of the latter, a web synchronized with the picker elements and stripper plate for extension beneath the picker elements prior to the downward movement of the stripper plate for receiving the cotton stripped from the picker elements, and means synchronized with the stripper plate for withdrawing the web to discharge the cotton thereon following the stripping operation of the stripper plate.

4. A cotton picker comprising, a stationary frame, a vertically movable frame mounted above said stationary frame, means for vertically reciprocating the movable frame, a perforated stripper plate disposed beneath the movable frame, resilient means exerting a downward force on the stripper plate to normally seat the same on the stationary frame, a plurality of vertically disposed rotatable picker elements carried by the movable frame for extension through the perforated stripper plate during downward movement of the movable frame, means for connecting the stripper plate with the movable frame to provide for the lifting of the stripper plate during the first portion of the upward movement of the movable frame, releasing means for said connecting means to provide for downward movement of the stripper plate to strip the cotton from the picker elements upon a continued upward movement of the latter, a web automatically movable beneath the picker elements prior to the downward movement of the stripper plate for receiving the cotton stripped from the picker elements, and means operated by the upward movement of the movable frame for withdrawing the web to discharge the cotton thereon following the stripping operation of the stripper plate.

5. A cotton picker comprising, a stationary frame, a vertically movable frame mounted above said stationary frame, means for vertically reciprocating the movable frame, a perforated stripper plate disposed beneath the movable frame, resilient means exerting a downward force on the stripper plate to normally seat the same on the stationary frame, a plurality of vertically disposed rotatable picker elements carried by the movable frame for extension through the perforated stripper plate during downward movement of the movable frame, upwardly and inwardly inclined guides mounted on the stationary frame, pivoted levers carried by the movable frame, said levers having their upper ends in engagement with the guides and having their lower ends provided with noses for engagement with the stripper plate to lift the latter during the first portion of the upward movement of the movable frame, said guides operating to release said noses to provide for downward movement of the stripper plate to strip the cotton from the picker elements upon a continued upward movement of the latter, a web for receiving the cotton stripped from the picker elements, and means for withdrawing the web to discharge the cotton thereon following the stripping operation of the stripper plate.

6. A cotton picker comprising, a stationary frame, a vertically movable frame mounted above said stationary frame, means for vertically reciprocating the movable frame, a perforated stripper plate disposed beneath the movable frame, resilient means exerting a downward force on the stripper plate to normally seat the same on the stationary frame, a plurality of vertically disposed rotatable picker elements carried by the movable frame for extension through the perforated stripper plate during downward movement of the movable frame, said picker elements being provided with extensible and retractable needles, means to provide for the extension of the needles when the movable frame reaches the end of its downward movement, means for connecting the stripper plate with the movable frame to provide for the lifting of the stripper plate during the first portion of the upward movement of the movable frame, releasing means for said connecting means to provide for downward movement of the stripper plate to strip the cotton from the picker elements upon a continued upward movement of the latter, said needles being retracted during said continued upward movement, a web normally maintained out of the path of movement of the picker elements, tension means operating prior to the downward movement of the stripper plate to extend the web beneath the plate for receiving the cotton stripped from the picker elements, and means synchronized with the stripper plate for withdrawing the web to discharge the cotton thereon following the stripping operation of the stripper plate.

7. A cotton picker comprising, a stationary frame, a vertically movable frame mounted above said stationary frame, means for vertically reciprocating the movable frame, a floating plate suspended beneath the movable frame, a perforated stripper plate disposed beneath the floating plate, resilient means exerting a downward force on the stripper plate to normally seat the same on the stationary frame, a plurality of vertically disposed rotatable picker elements carried by the movable frame and extending therethrough, said picker elements having extensible and retractable needles, housings carried by the floating plate for the lower end portions of the picker elements, said housings having slots for the reception of said needles therethrough, said housing passing through the stripper plate during the downward movement of the movable frame, means for arresting downward movement of the housings for extending the needles therethrough at the lower end of the downward movement of the movable frame, means for connecting the stripper plate with the movable frame to provide for the lifting of the stripper plate during the first portion of the upward movement of the movable frame, releasing means for said connecting means to provide for downward movement of the stripper plate to strip cotton from the picker elements upon the continued upward movement of the latter, compression springs interposed between the movable frame and floating plate for retracting the needles during said continued upward movement, a web for receiving the cotton stripped from the picker elements, and means for withdrawing the web to discharge the cotton thereon following the stripping operation of the stripper plate.

8. A cotton picker comprising, a stationary frame, a drive shaft carried thereby, a vertically movable frame operated by said drive shaft, a plurality of vertically disposed rotatable picker elements carried by the movable frame, a perforated stripper plate through which said picker elements extend, releasable means connecting the stripper plate with the movable frame to provide for movement of the plate with the picker elements for a predetermined distance in an upward direction, means for moving said plate downwardly upon the continued upward movement of the picker elements to strip cotton from the latter, a roller rotatably mounted on the stationary frame, a web secured to the roller and extending beneath the stripper plate to receive cotton stripped from the picker elements, normally inoperative means for driving said roller from the drive shaft to wind the web on the roller, and means carried by the movable frame for rendering said normally inoperative means operative upon the completion of the stripping operation of the stripper plate.

9. A cotton picker comprising, a stationary frame, a drive shaft carried thereby, a pair of spaced, oppositely disposed beveled gears slidably and nonrotatably mounted on the drive shaft, a yoke connecting said gears, a driven shaft having a beveled gear for engagement with said oppositely disposed beveled gears selectively, a pinion on the driven shaft, a vertically movable frame having a rack in engagement with said pinion, means for shifting said yoke at the upper and lower extremes of movement of the movable frame, a plurality of vertically disposed rotatable picker elements carried by the movable frame, a perforated stripper plate through which said picker elements extend, releasable means connecting the stripper plate with the movable frame to provide for movement of the plate with the picker elements for a predetermined distance in an upward direction, means for moving said plate downwardly upon a continued upward movement of the picker elements to strip cotton from the latter, a web for receiving the cotton stripped from the picker elements, and means for withdrawing the web to discharge the cotton thereon following the stripping operation of the stripper plate.

10. A cotton picker comprising, a stationary frame, a drive shaft carried thereby, a vertically movable frame reciprocated by rotary motion of said drive shaft in one direction, a plurality of vertically disposed rotatable picker elements carried by the movable frame, a driven shaft carried by the movable frame for rotating the picker elements, driving means connecting the drive shaft with the driven shaft for driving the latter, a perforated stripper plate through which said picker elements extend, releasable means connecting the stripper plate with the movable frame to provide for movement of the plate with the picker elements for a predetermined distance in an upward direction, means for moving said plate downwardly upon a continued upward movement of the picker elements to strip cotton from the latter, a web for receiving the cotton stripped from the picker elements, and means for withdrawing the web to discharge the cotton thereon following the stripping operation of the stripper plate.

11. A cotton picker comprising, a frame, means for vertically reciprocating the frame, a plurality of vertically disposed picker elements carried by the frame, a stripper element releasably connected with the frame to move therewith during a predetermined portion of the upward movement of the latter, means operable upon a continued upward movement of the frame for moving the stripper element downwardly to strip the cotton from the picker elements, a cotton receiving member, means operable by the upward movement of the frame and in advance of the downward movement of the stripper element for moving said receiving member beneath the picker elements to receive the cotton stripped from the latter, and means operable by the upward movement of the frame following the downward movement of the stripper element for withdrawing said receiving member from beneath the picker elements.

12. A cotton picker comprising, a vertically movable frame, a drive shaft rotatable in one direction, means operatively connecting the drive shaft with the frame to provide for the reciprocation of the latter upon the rotation of the former, a plurality of vertically disposed picker elements carried by the frame, a stripper element releasably connected with the frame to move therewith during a predetermined portion of the upward movement of the latter, means operable upon a continued upward movement of the frame for moving the stripper element downwardly to strip the cotton from the picker elements, a cotton receiving member, means operable by the upward movement of the frame and in advance of the downward movement of the stripper element for moving said receiving member beneath the picker elements to receive the cotton stripped from the latter, means operable by the upward movement of the frame following the downward movement of the stripper element for withdrawing said receiving member from beneath the picker element, and means for automatically breaking the operative connection between the drive shaft and frame when the latter reaches the limit of its upward movement.

13. A cotton picker comprising, a stationary frame, a vertically movable frame, a driven shaft carried by the stationary frame and rotatable in opposite directions to reciprocate the movable frame, a drive shaft carried by the stationary frame and rotatable in one direction, a shiftable coupling mechanism for operatively connecting said shafts to provide for the rotation of the driven shaft in opposite directions selectively, manually operated means for shifting the coupling mechanism for initiating downward movement of the movable frame, a guide member carried by the movable frame and having an endless groove, a crank secured to the coupling mechanism and having a roller within said groove to maintain the coupling mechanism in its manually shifted position during downward movement of the movable frame, tension means operating to automatically shift the coupling mechanism at the limit of downward movement of the movable frame, a plurality of picker elements carried by the movable frame, and means operated by the upward movement of the movable frame for stripping the cotton from the picker elements.

14. In a cotton picker, a vertically movable frame means for vertically reciprocating the frame, a plurality of vertically disposed picker elements extending through the frame, tubular housings into which the lower ends of the picker elements extend, a plate disposed beneath the frame and having said housings extending therethrough, flanges on the upper ends of the housings seated against the upper face of said plate, coiled springs encircling the picker elements between said flanges and frame, retaining members seated on the frame and having said picker elements extending therethrough, stop members at the upper ends of the picker elements, and coiled springs encircling the picker elements between said stop members and retaining members.

15. A cotton picker comprising, a plurality of picker elements, means for vertically reciprocating the picker elements, stripping means operating during the upward movement of the picker elements for stripping cotton therefrom, and horizontally reciprocating means synchronized with said picker elements and stripping means for receiving and discharging the cotton stripped from the picker elements.

16. A cotton picker comprising, a plurality of picker elements for picking cotton from standing plants, means for reciprocating the picker elements toward and from the standing plants, stripping means operating during the movement of the picker elements away from the plants for stripping cotton from the picker elements, and means reciprocating in a path crossing the path of the reciprocating picker elements and synchronized with the latter and with the stripping means for receiving and discharging the cotton stripped from the picker elements.

In testimony whereof, I affix my signature hereto.

PRESSLEY E. WOOTEN.